Patented Nov. 23, 1937

2,099,812

UNITED STATES PATENT OFFICE 2,099,812

MANUFACTURE OF SHAPED PRODUCTS IMPERMEABLE TO MOISTURE

Walter König, Wiesbaden, Germany, assignor to Rudolph Koepp & Co. Chemische Fabrik A. G., Oestrich in Rheingau, Germany, a German company No Drawing. Application September 8, 1936, Serial No. 99,849. In Germany September 30, 1935

1 Claim. (Cl. 91—68)

This invention relates to a process for the manufacture of shaped products impermeable to moisture from cellulose formate and derivatives of cellulose formate.

A disadvantage for many purposes of application of the known thin sheets of cellulose or its derivatives is that they are to a certain extent permeable to water or water vapour. Attempts have been made to overcome this disadvantage by coating the sheets with a varnish, the fundamental constituent of which mostly consists of cellulose derivatives dissolved in the usual organic solvents and which contains in addition water-repelling agents, such as resins, softeners, waxes and the like. The thin sheets so prepared are, it is true, practically impermeable to water at the outset, but have the unpleasant property that the coating even after only short contact with water readily becomes detached.

Attempts have also been made to overcome this latter disadvantage. Thus, for example, it has already been proposed first to treat thin sheets of cellulose, cellulose hydrate or cellulose ethers with organic liquids which are miscible with water and have a swelling effect on cellulose gels and, after removing the said liquids, to coat the sheets in a manner known per se with varnish. The coating produced in this manner however also does not acquire the desired desistance to water, since it is not sufficiently firmly fixed in the base, owing to the fact that the swelling effect again decreases during the process of heating the sheets, for example to 70 to 80° C. for the purpose of removing the swelling agent.

According to this invention it has been found that coatings, which adhere satisfactorily even in the presence of water or moisture to sheets of cellulose formate may be obtained already in one operation, if the sheets are coated with a varnish, to which suitable quantities of formic acid have been added. This addition is particularly advantageous in the treatment of thin sheets of cellulose formate. Whereas formic acid by itself completely dissolves cellulose formate, in admixture with the solvents, for example acetone, butyl acetate and the like, for the cellulose esters, such as nitrocellulose or cellulose acetate, used as basic constituent of varnishes, it only exerts a swelling action and occasionally a slight dissolving action on the cellulose formate and constitutes an excellent medium between the varnish and the sheet as base. The coating is consequently firmly and intimately fixed on the sheet, so that it does not, or only with great difficulty, become detached from the latter, even after lying in water for several hours.

The use of formic acid is also attended with considerable economic advantages, insofar as a part of the relatively expensive varnish solvents usually employed, such as acetone, butyl acetate and the like can be replaced thereby.

The process of this invention may for example be carried out by dissolving nitrocellulose, resins, softeners, waxes or other water-repelling agents in butyl acetate, ethyl acetate, acetone and the like, adding suitable quantities of formic acid to the resulting solution and coating the thin sheets to be impregnated with this varnish solution by dipping, spraying, painting or in any desired other manner and finally drying the coated sheets at ordinary or preferably elevated temperature.

A coating is obtained which, even after the sheets have been immersed for several hours in water, does not become detached and is practically impermeable to water and moisture.

Example 5 parts by weight of a 20% alcoholic shellac solution, 4 parts by weight of a 25% solution of a high boiling phenol ether and butyl acetate and 0.4 part by weight of tricresyl phosphate are added to 20 parts by weight of a 10% solution of nitrocellulose in butyl acetate. 25 parts by weight of formic acid are then stirred into this mixture. The resulting varnish is applied in a manner known per se to the thin sheets of cellulose formate, and dried.

What I claim is:

A process for the manufacture of shaped products impermeable to moisture from cellulose formate and derivatives of cellulose formate, which consists in coating the shaped products with a varnish, which contains water-repelling substances and formic acid.

WALTER KÖNIG.